(12) United States Patent
Johnson

(10) Patent No.: US 9,380,249 B2
(45) Date of Patent: Jun. 28, 2016

(54) SYSTEM AND METHOD FOR CONSERVING POWER FOR DEVICES

(75) Inventor: Ronald Douglas Johnson, Westfield, IN (US)

(73) Assignee: THOMSON LICENSING, Issy les Moulineaux (FR)

( * ) Notice: Subject to any disclaimer, the term of this patent is extended or adjusted under 35 U.S.C. 154(b) by 888 days.

(21) Appl. No.: 13/580,704

(22) PCT Filed: Mar. 11, 2010

(86) PCT No.: PCT/US2010/026957
§ 371 (c)(1),
(2), (4) Date: Aug. 23, 2012

(87) PCT Pub. No.: WO2011/112192
PCT Pub. Date: Sep. 15, 2011

(65) Prior Publication Data
US 2012/0319503 A1 Dec. 20, 2012

(51) Int. Cl.
| | |
|---|---|
| H01H 35/00 | (2006.01) |
| H04N 5/44 | (2011.01) |
| H04N 21/422 | (2011.01) |
| H04N 5/63 | (2006.01) |

(52) U.S. Cl.
CPC ....... *H04N 5/4403* (2013.01); *H04N 21/42222* (2013.01); *H04N 5/63* (2013.01); *H04N 2005/4428* (2013.01); *Y10T 307/786* (2015.04)

(58) Field of Classification Search
None
See application file for complete search history.

(56) References Cited

U.S. PATENT DOCUMENTS

| | | | |
|---|---|---|---|
| 5,554,980 A | | 9/1996 | Hashimoto et al. |
| 5,797,107 A | * | 8/1998 | Berg et al. .................... 701/32.3 |
| 6,549,834 B2 | | 4/2003 | McClellan et al. |
| 7,233,316 B2 | | 6/2007 | Smith et al. |
| 2006/0185429 A1 | | 8/2006 | Liu et al. |
| 2007/0054651 A1 | | 3/2007 | Farmer et al. |

(Continued)

FOREIGN PATENT DOCUMENTS

| | | |
|---|---|---|
| CN | 101578571 | 11/2009 |
| EP | 2166433 | 3/2010 |

(Continued)

OTHER PUBLICATIONS

Freescale Semiconductor 3-Axis Orientation Motion Detection Sensor, Rev 5, Jul. 2009.
(Continued)

*Primary Examiner* — Jared Fureman
*Assistant Examiner* — Aqeel Bukhari
(74) *Attorney, Agent, or Firm* — Robert D. Shedd; Jerome G. Schaefer

(57) ABSTRACT

A power conservation circuit for a hand-held motion-sensing device and a method for conserving power on such devices are provided. The present disclosure provides for sensing the movement of device by a sensor and outputting a sense signal in response to the movement, processing the sense signal output of the sensor by a processing circuit, selectively enabling and disabling power to the processing circuit (404) by a power management circuit and providing a signal by a motion detect circuit to the power management circuit for enabling power to the processing circuit based on the sense signal from the sensor. The motion detect circuit differentiates the sense signal from the sensor and provides a power enable signal to the power management circuit if the differentiated sense signal exceeds a signal threshold.

24 Claims, 9 Drawing Sheets

(56) References Cited

U.S. PATENT DOCUMENTS

| | | | |
|---|---|---|---|
| 2007/0288779 A1* | 12/2007 | Kim | 713/320 |
| 2009/0072992 A1* | 3/2009 | Yun | 340/825.22 |
| 2009/0303204 A1 | 12/2009 | Nasiri et al. | |
| 2010/0009754 A1 | 1/2010 | Shimamura et al. | |
| 2010/0172052 A1 | 7/2010 | Shibata | |
| 2015/0046734 A1 | 2/2015 | Kabasawa | |

FOREIGN PATENT DOCUMENTS

| | | |
|---|---|---|
| JP | H07284166 | 10/1995 |
| JP | H10205186 | 8/1998 |
| JP | H10262287 | 9/1998 |
| JP | H10304480 | 11/1998 |
| JP | 2004120161 | 4/2004 |
| JP | 2005157465 | 6/2005 |
| JP | 2006324899 | 11/2006 |
| JP | 2006526844 | 11/2006 |
| JP | 2010009217 | 1/2010 |
| WO | WO2009008411 | 1/2009 |
| WO | WO2009037970 | 3/2009 |

OTHER PUBLICATIONS

Malinowski, et. al., "CargoNet: A Low-Cost MicroPower Sensor Node Exploiting Quasi-Passive Wakeup for Adaptive Asynchronous Monitoring of Exceptional Events", Nov. 6-9, 2007.
Search Report dated Jul. 22, 2010.

* cited by examiner

SYSTEM AND METHOD FOR CONSERVING POWER FOR DEVICES

This application claims the benefit, under 35 U.S.C. §365 of International Application PCT/US10/026957, filed Mar. 11, 2010, which was published in accordance with PCT Article 21(2) on Sep. 15, 2011 in English.

TECHNICAL FIELD OF THE INVENTION

The present disclosure generally relates to hand-held motion-sensing "in-air" pointing devices, and more particularly, to a power conservation circuit for such devices and a method for conserving power on such devices including accelerometers.

BACKGROUND OF THE INVENTION

Interactive multi-media centers are characterized by an increasing number of channels of programming available and an increasing amount of functionality offered. The increased number of available channels results from increased program availability from such services as cable and satellites. New types of functionality include recording, time-shifting, and convergence with the Internet. These increases in available programming and functionality result in a dense and complex user interface in an environment that typically does not have a desktop for a mouse or keyboard, the standard input devices for the complex user interfaces typical of personal computers. Rather, the typical user input devices of choice for televisions and multi-media centers is one or more infra-red (IR) remote controls laden with pushbuttons, including arrow, keypad and dedicated function buttons. These button-laden remote controls are utilized for the selection of channels and functions and for onscreen navigation. However, current interactive televisions and multi-media centers now have too many channels and functions for this type of interface to be effective and a more efficient interface is desired.

Preferably, such an interface and controller for the above-mentioned systems would allow efficient navigation, selection and activation in a dense interface that requires fewer individual buttons on the remote control and allows the user to view the screen rather than the remote control while making selections.

To overcome the drawbacks of the conventional remote control device, devices have been developed that replace inputs to the device via buttons and the like with inputs generated by movements or gestures of a user holding the device. These devices track movement by sensing acceleration in the x, y or z dimension via a motion-based sensor disposed in the device. These sensed movements are translated into inputs to navigate an interface, operate an external device, simulate user activity in a gaming system, etc. In fact, motion-based sensors are becoming the man-machine interface of choice for a variety of devices including game controllers, mobile hard drives, consumer remote controls, mobile phones, portable media players, personal digital assistants, among others.

However, in order to detect motion, a device including a motion-based sensor has to continually sample acceleration values to detect changes in the device's position. For example, in a microprocessor based device, the microprocessor has to be running and continuously sampling acceleration measurements. This operation expends a large amount of power, e.g., battery power in a portable device, even when the device is at rest. Therefore, a need exists for techniques for conserving power on devices having such motion-based sensors.

SUMMARY

A power conservation circuit for a hand-held motion-sensing "in-air" pointing device and a method for conserving power on such devices including accelerometers are provided. Because accelerometers are almost always active at least in one direction, devices including such accelerometers tend to constantly require power. However, much of the sensing performed by the accelerometer is not necessary or important to its function. A circuit, including an op-amp and a set of diodes as an analog differentiator, is used to alter the outputs of the accelerometer sensors to allow a microprocessor, used for processing the direct accelerometer outputs, to enter a power down mode and to be powered up only as necessary. Such a solution can allow battery operated controllers (e.g., a game remote, a multi-media center remote control or the like) to conserve battery power.

According to one aspect of the present disclosure, a device is provided including a sensor for sensing the movement of the device and outputting a sense signal in response to the movement, a processing circuit for processing the sense signal output of the sensor, a power management circuit for selectively enabling and disabling power to the processing circuit, and a motion detect circuit coupled to the output of the sense circuit and to an input of the power management circuit, the motion detect circuit for providing a signal to the power management circuit for enabling power to the processing circuit based on the sense signal from the sensor.

In another aspect, the motion detect circuit differentiates the sense signal from the sensor and provides a power enable signal to the power management circuit if the differentiated sense signal exceeds a signal threshold.

In a further aspect, the sensor is a 3-axis motion sensing device where the motion detect circuit is configured to detect an absolute value of the change in acceleration of at least one of the 3 axes. The motion detect circuit provides a power enable signal to the power management circuit if the absolute value signal exceeds a signal threshold.

According to another aspect of the present disclosure, a method for conserving power in a wireless hand-held motion-sensing controller is provided, the method including sensing the motion of the controller by a sensor and outputting a sense signal in response to the motion, processing the sense signal output of the sensor by a processing circuit, determining if the motion of the controller exceeds a threshold based on the sense signal from the sensor, and enabling power to the processing circuit when the motion exceeds the threshold.

BRIEF DESCRIPTION OF THE DRAWINGS

These, and other aspects, features and advantages of the present disclosure will be described or become apparent from the following detailed description of the preferred embodiments, which is to be read in connection with the accompanying drawings.

In the drawings, wherein like reference numerals denote similar elements throughout the views.

Figure 1:
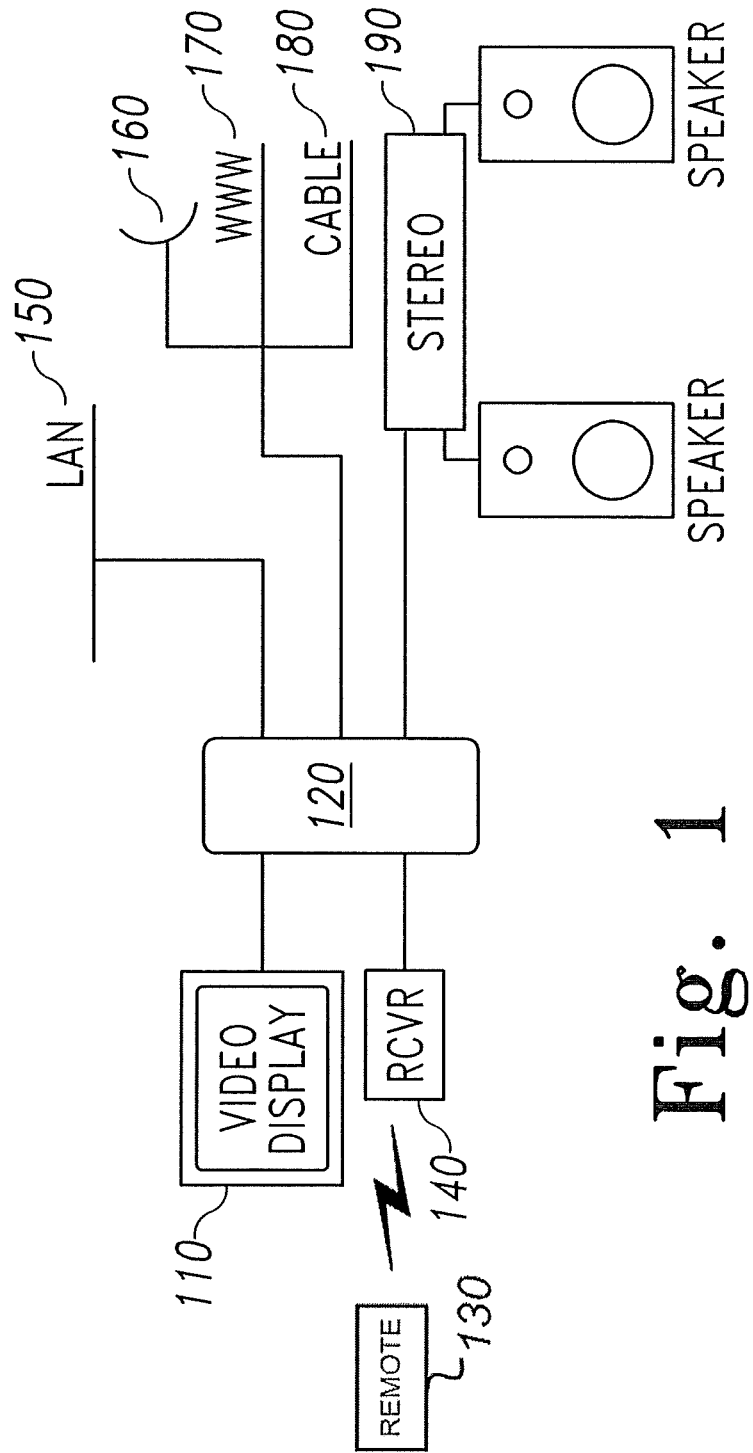
FIG. 1 is a block diagram of a multi-media center including a hand-held motion-sensing remote control in accordance with the present disclosure.

It should be understood that the drawing(s) is for purposes of illustrating the concepts of the disclosure and is not necessarily the only possible configuration for illustrating the disclosure.

DETAILED DESCRIPTION OF PREFERRED EMBODIMENTS

It should be understood that the elements shown in the FIGS. may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

A power conservation circuit for a hand-held motion-sensing "in-air" pointing device and a method for conserving power on such devices including sensors, such as, but not limited to, accelerometers, gyroscopes and the like are provided. For ease of description, the following discussion will focus on accelerometers. However, it should be understood that devices using other sensors (such as gyroscopes) also benefit from the teaching of the present disclosure and are considered within the scope of the present disclosure and appended claims. Because accelerometers are almost always active at least in one direction, devices including accelerometers tend to constantly require power. However, much of the sensing performed by the accelerometer is not necessary or important to its function. A circuit, including an op-amp and a set of diodes as an analog differentiator, is used to alter the outputs of the accelerometer sensors to allow a microprocessor, used for processing the direct accelerometer outputs, to enter a power down mode and to be powered up only as necessary. Such a solution can allow battery operated controllers, used in conjunction with multi-media centers, gaming systems, computers and the like, to conserve battery power.

A typical multi-media center is illustrated in FIG. 1. The multi-media center includes a video display 110, which may be a conventional television with a tuner, a multi-media computer 120, a remote controller 130, a receiver 140 for the remote controller, and multiple input sources, including a LAN 150, a satellite 160, an interface to the worldwide web 170 and a television cable input 180. In this illustration, a stereo system 190 under the control of the multi-media computer is shown coupled to the multi-media computer 120. However, as is well known in the art, there are many alternative configurations for these components.

The remote controller 130 is configured as a hand-held motion-sensing controller adapted for use as a cursor control device for the computer 120. The controller responds to movements (e.g. pitch, yaw and roll) of the user's hand, which are subsequently converted to object or state movement within the electronic display permitting relatively large, fast and accurate movements to be accurately defined without requiring large and tiring hand movements. The controller is self-contained (i.e. inertial) and is thus not subject to sources of outside noise or and is not constrained to use in any specific orientation or within any predetermined volume. More specifically, the resulting controller is responsive to angles defined by movements of the controller (i.e. changes in the direction of pointing vectors), as distinct from detecting its position relative to a reference device or surface, and can be used either in free space or while sitting on a surface. Unlike a classical pointing device, such as a stick or flashlight, it does not require position or vector information to "point" to another fixed position. Rather, the motion information, i.e., changes in "yaw", "pitch" and "roll", is transformed directly into changes in the "x", "y" and "z" coordinates within a display. These coordinates can be used to translate a cursor position on a graphics display or otherwise interact with the graphics user interface. The inertial motion-sensing controller of the present disclosure can be configured from gyroscopic or accelerometer-based sensors, as will be described in more detail below.

Figure 2:
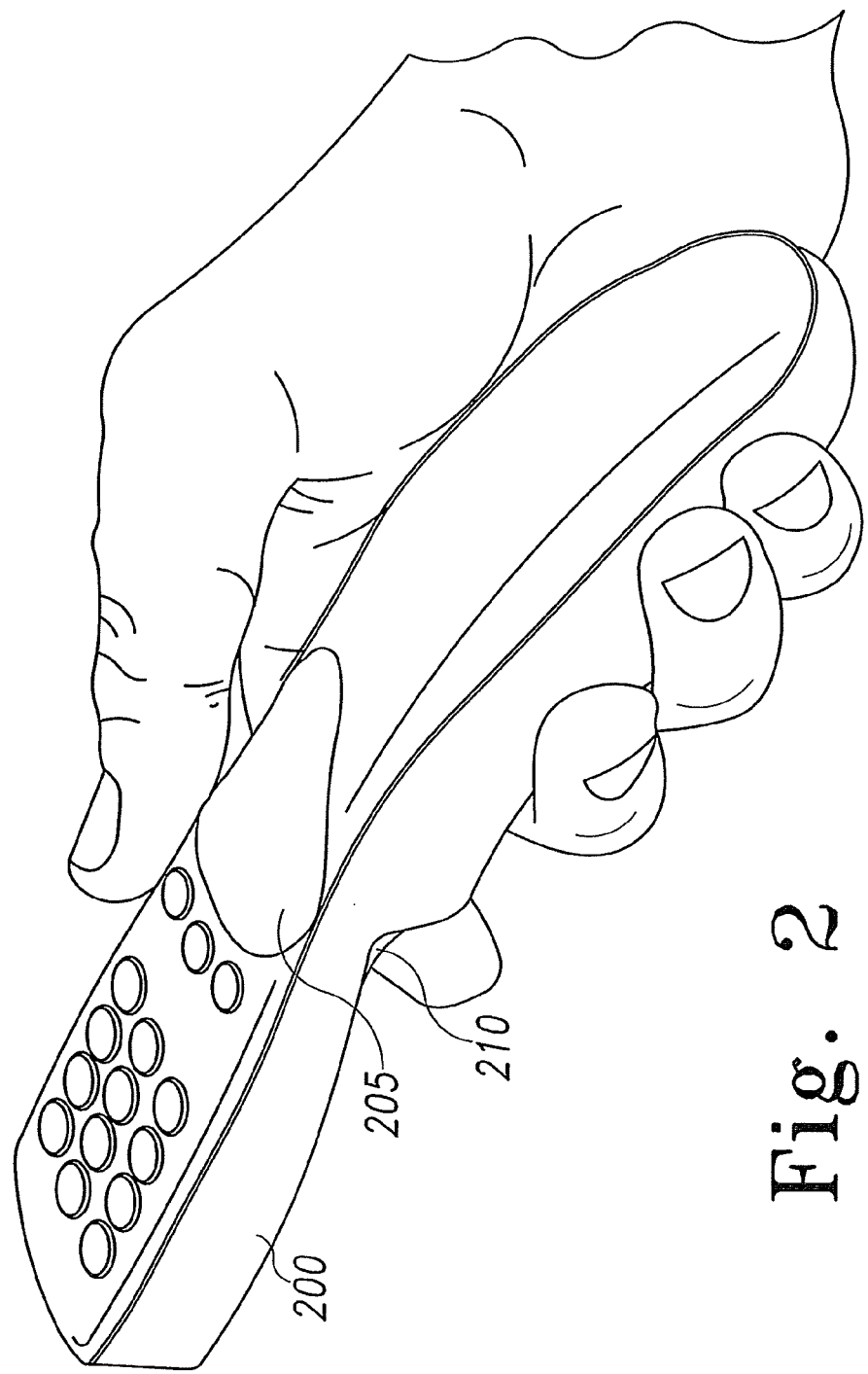
FIG. 2 is a perspective view of a wireless hand-less motion-sensing controller in accordance with the present disclosure.

An exemplary hand-held motion-sensing controller 200 is illustrated in FIG. 2. Controller 200 includes a thumb button 205, positioned on the top side of controller 200 so as to be selectively activated by a user's thumb. Throughout this description, activation of thumb button 205 will also be referred to as a "click," a command often associated with activation or launch of a selected function. Controller 200 further includes a trigger button 210, positioned on the bottom side of controller 200 so as to be selectively activated by a user's index (or "trigger") finger. Throughout this description, activation of trigger button 210 will also be referred to as a "trigger," and movement (e.g. pitch, yaw and/or roll) of the controller 200 while the trigger is depressed will be referred to as a "trigger-drag." A trigger-drag command is often associated with movement of a cursor, virtual cursor or other indication of the user's interactive position on the display, such as a change of state (i.e., a highlighted or outlined cell), and is commonly used to navigate in and select entries from the interactive display.

Figure 3:
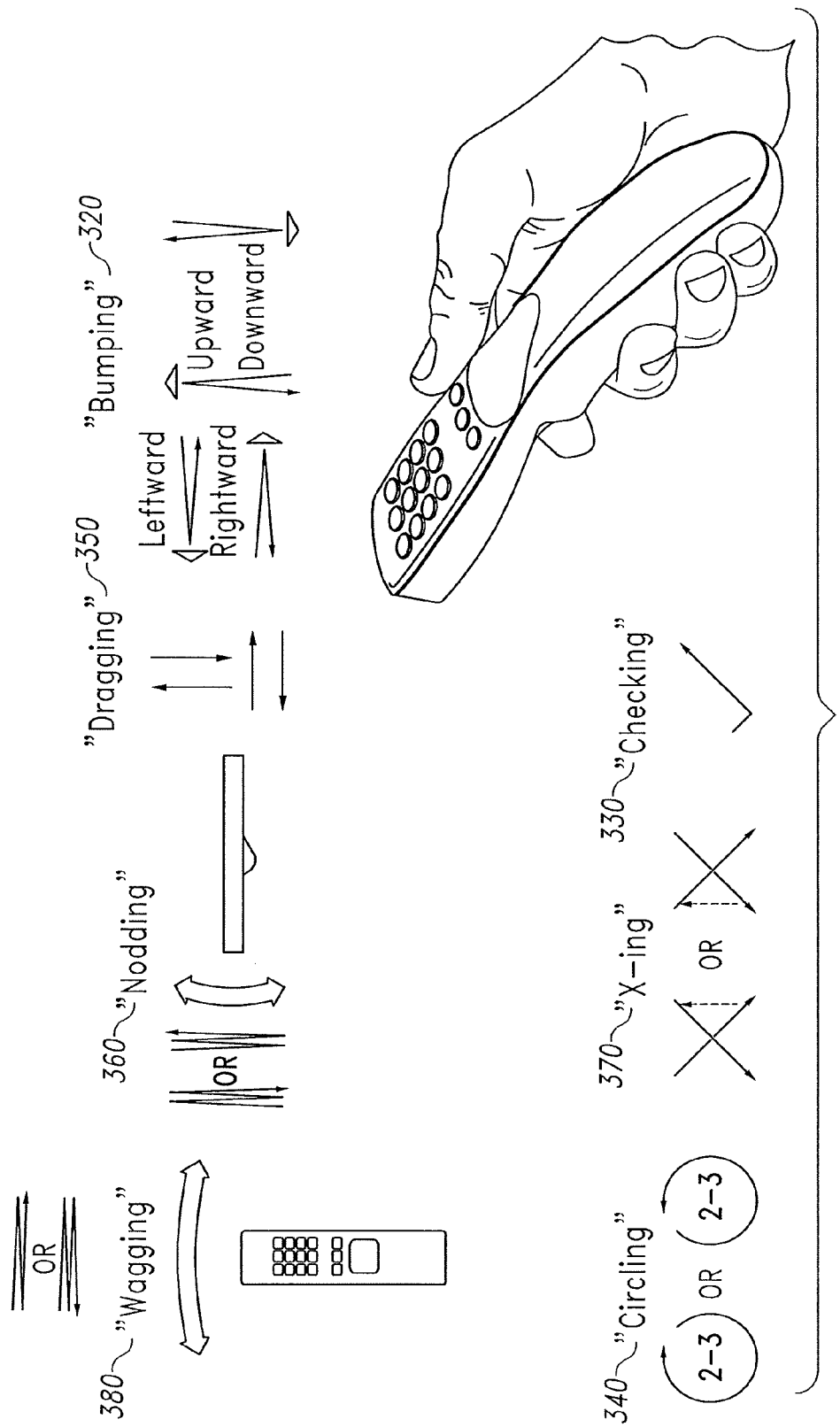
FIG. 3 illustrates a number of gestures in accordance with the present disclosure.

The use of a hand-held motion-sensing controller provides for a number of types of user interaction. When using a motion-sensing controller, changes in yaw map to left-and-right motions, changes in pitch map to up-and-down motions and changes in roll map to rotational motions along a longitudinal axis of the controller. These inputs are used to define gestures and the gestures, in turn, define specific contextual commands. As such, a combination of yaw and pitch can be used to define any 2-dimensional motion, such as a diagonal, and a combination of yaw, pitch and roll can be used to define any 3-dimensional motion, such as a swing. A number of gestures are illustrated in FIG. 3. Gestures are interpreted in context and are identified by defined movements of the controller 200 while the trigger button 210 is held ("trigger-drag" movements).

Bumping 320 is defined by a two-stroke drawing indicating pointing in one direction, either up, down, left or right. The bumping gesture is associated with specific commands in context. For example, in a TimeShifting mode, a left-bump gesture 320 indicates rewinding, and a right-bump gesture indicates fast-forwarding. In other contexts, a bump gesture 320 is interpreted to increment a particular value in the direction designated by the bump. Checking 330 is defined as in drawing a checkmark. It is similar to a downward bump gesture 320. Checking is identified in context to designate a reminder or user tag. Circling 340 is defined as drawing a circle in either direction. It is possible that both directions could be distinguished. However, to avoid confusion, a circle is identified as a single command regardless of direction. Dragging 350 is defined as an angular movement of the controller (a change in pitch and/or yaw) while holding trigger button 210 (i.e., a "trigger drag"). The dragging gesture 350 is used for navigation, speed, distance, time-shifting, rewinding, and forwarding. Dragging 350 can be used to move a cursor, a virtual cursor, or a change of state, such as highlighting outlining or selecting on the display. Dragging 350 can be in any direction and is generally used to navigate in two dimensions. However, in certain interfaces, it is preferred to modify the response to the dragging command. For example, in some interfaces, operation in one dimension or direction is favored with respect to other dimensions or directions depending upon the position of the virtual cursor or the direction of movement. Nodding 360 is defined by two fast trigger-drag up-and-down vertical movements. Nodding 360 is used to indicate "Yes" or "Accept." X-ing 370 is defined as in drawing the letter "X." X-ing 370 is used for "Delete" or "Block" commands. Wagging 380 is defined by two trigger-drag fast back-and-forth horizontal movements. The wagging gesture 380 is used to indicate "No" or "Cancel."

In certain embodiments, 3-dimensional motion will be employed to interface with a gaming system. A controller, such as controller, such as controller 200, will sense motion in three axes to replicate physical motion of the user. For example, the sensed motion may replicate a throwing motion or a swing of a baseball bat. It is to be appreciated that the interfaces described above are exemplary and the teachings of the present disclosure in numerous types of interfaces.

Figure 4:
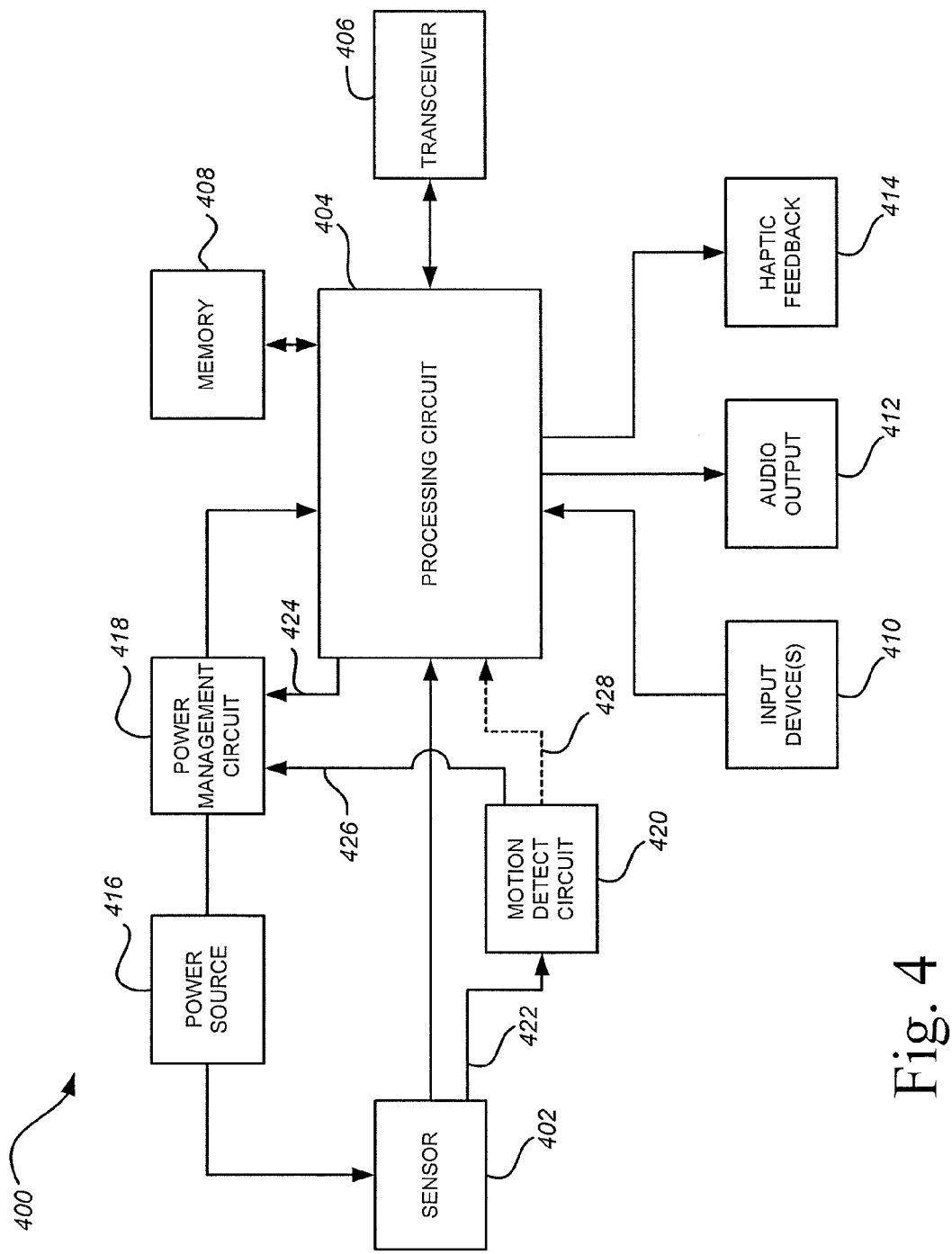
FIG. 4 is a block diagram of a wireless hand-less motion-sensing controller in accordance with the present disclosure.

Referring to FIG. 4, a block diagram of a wireless hand-less motion-sensing controller 400 in accordance with the present disclosure is provided. Controller 400 may generally operate and function using the principles described for controller 200 in FIG. 2 described above. Generally, the controller 400 includes a sensor for sensing movement of the controller 400 and outputting a sense signal in response to the movement, a processing circuit 404 for processing the sense signal output of the sensor 402 and outputting control signals based on the sense signal and a transceiver 406 for transmitting control signals to a receiver of an external system, e.g., receiver 140 of the multi-media center shown in FIG. 1. The processing circuit 404 may be implemented in any of the various known hardware configurations including but not limited to a central processing unit (CPU), a microprocessor or a digital signal processor (DSP). Memory 408 is coupled to the processing circuit 404 and may store executable instructions required by the processing circuit 404 and/or control codes for the various components of the multi-media center. The transceiver 406 will operate under any of the various known wireless protocols including but not limited to Bluetooth™ interconnectivity, infrared connectivity, radio transmission connectivity including computer digital signal broadcasting and reception commonly referred to as Wi-Fi or the Institute of Electrical and Electronics Engineers (IEEE) standard 802.11.X (where x denotes the type of transmission), or any other type of communication protocols or systems currently existing or to be developed for wirelessly transmitting and receiving data.

The controller 400 further includes various input/output devices for adding functionality to the controller 400. Input devices 410 are provided on the controller 400 for entering information and selectively activating functions. Such input devices 410 may include thumb button 205, trigger button 210, a numerical keypad and a microphone. Output devices may also be disposed on or in the controller 400 to provide feedback to a user. Exemplary output devices may include an audio output 412 such as a speaker or buzzer and haptic (i.e. touch-based) feedback devices 414 such as an actuator for applying a force or vibration to the controller 400.

It is to be appreciated that a system bus couples the various components of the controller 400 described above and may be any of several types of bus structures including a memory bus or memory controller, a peripheral bus, and a local bus using any of a variety of bus architectures.

A power source 416, e.g., a battery, is included to provide power to the appropriate components of the controller 400 that require power for operation. A power management circuit 418 is coupled to the power source 416 and selectively provides or disables power to the various components of the controller 400. For example, when the controller 400 is at rest and not in use, the power management circuit 418 may disable power to certain components which use a large amount of power such as the processing circuit 404 and provide power to the necessary components which will be required to indicate that the controller 400 is in use and needs to power up such as sensor 402. It is to be appreciated that the controller 400 will operate in at least two operating modes: a power down mode and a power up mode. The power down mode will be initiated when the controller is not in use and at rest. In power down mode, unnecessary components will be powered down or shut off to conserve the power source 416. The power down mode may be initiated by manual input via a button or may be timer-based. In the timer-based embodiment, the power down mode will be initiated if a predetermined period of time elapses between user inputs or between motions detected. In one embodiment, the processing circuit 404 will perform the timing function and signal the power management circuit 418 (via a power down mode signal or power disable signal) to enter the power down mode via connection 424, where the power management circuit 418 will selectively power down or shut off components. In another embodiment, the power management circuit 418 includes a timer or timing circuit to determine when to enter the power down mode.

The power up mode will be initiated at start up of the controller, e.g., when the controller is initially turned on, and when the controller is active after being in the power down mode, i.e., motion is sensed after a period of inactivity. In power up mode, all components will be powered up or turned on via the power source 416. The power up mode will be initiated when motion is sensed by a motion detect circuit 420. The motion detect circuit 420 is coupled to the sensor 420 for receiving a sense signal via connection 422 and further coupled to the power management circuit 418 for initiating the power up mode via connection 426. When the motion detect circuit 420 determines a motion has occurred in the controller 400 based on the sense signal received from the sensor 402, motion detect circuit 420 generates a power up mode signal, or a power enable signal, and transmits the power up mode signal (power enable signal) to the power management circuit 418 via the connection 426. The power management circuit 418 then provides power to the various components of the controller to enable full functionality.

Figure 5:
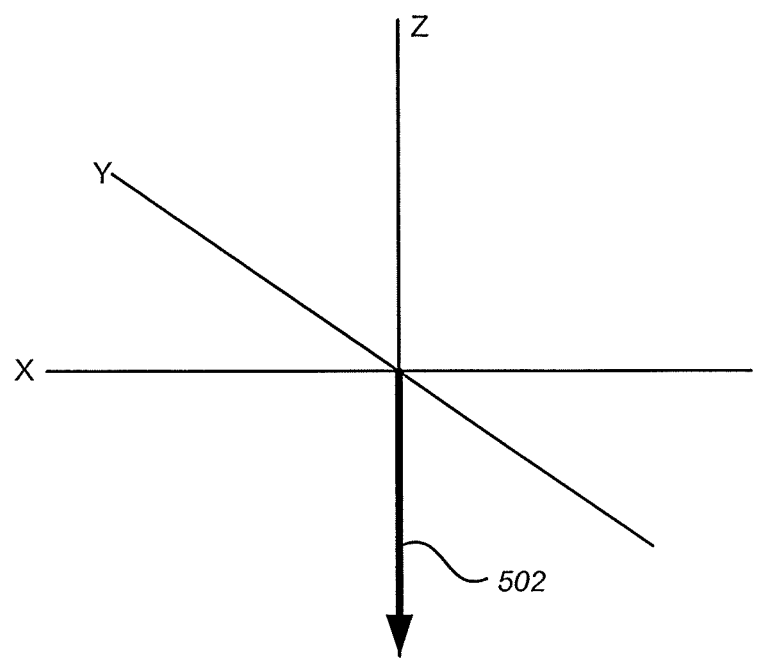
FIG. 5 illustrates an output of an accelerometer at rest in a three dimensional coordinate system due to the effects of gravity.

In one embodiment, the sensor 402 is a 3-axis accelerometer which outputs three individual signals which are each proportional to acceleration of the sensor in the x, y and z axes. The output of an accelerometer always has a non-zero value in at least one direction except when free falling in space. The reason for this non-zero value in at least one direction is because the gravitational constant always pulls at the accelerometer in the direction of the ground. FIG. 5 illustrates an accelerometer output voltage vector 502 when the controller 400 is at rest and the top of the accelerometer disposed in the controller 400 points away from the ground. The Z output will have a continuous non-changing voltage, represented by the vector 502, and the X and Y output will have no output. The vector can point in any direction based on the orientation of the accelerometer, e.g., when the controller is laying on its side on a table or couch. Since the one of the X, Y or Z outputs will always have a non-zero value signal, a detector is needed to detect changes in acceleration as delta acceleration over delta time, dA/dt.

Figure 6:
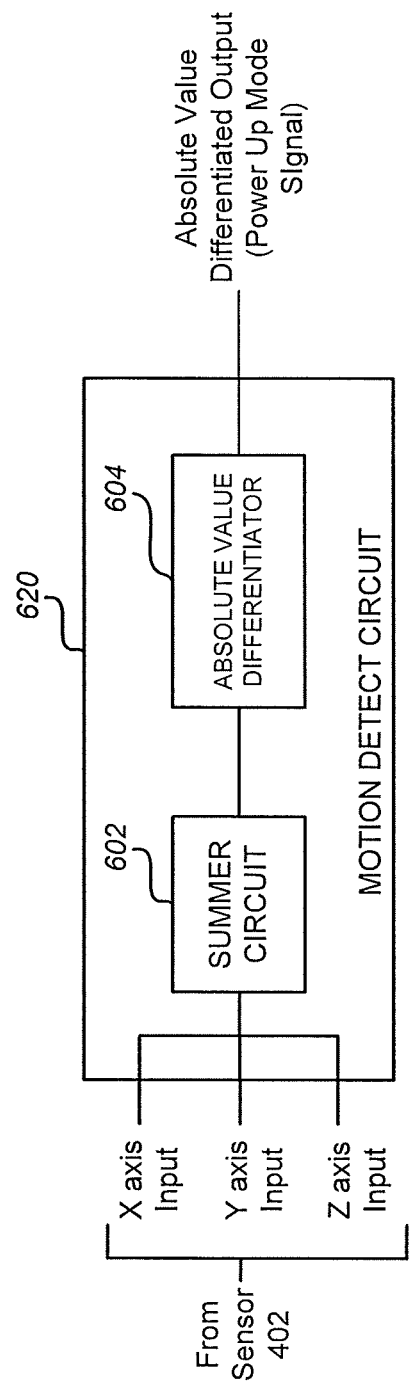
FIG. 6 is a block diagram of a motion detect circuit in accordance with the present disclosure.

Referring to FIG. 6, a block diagram of an embodiment of a motion detect circuit 620 is shown. The motion detect circuit 620 operates in a similar to the motion detect circuit 420 described in FIG. 4. The motion detect circuit 620 includes an absolute value differentiator 604 to detect the absolute value of the change in acceleration, dA/dt. By employing the differentiator 604, the motion detect circuit 620 is immune to the orientation of the sensor 402 and will only detect when changes in the acceleration outputted from the sensor occurs. The motion detect circuit 620 will further include a summer circuit 602 to sum the three axis input values, i.e., x, y, z values, from the sensor 402.

Figure 7:
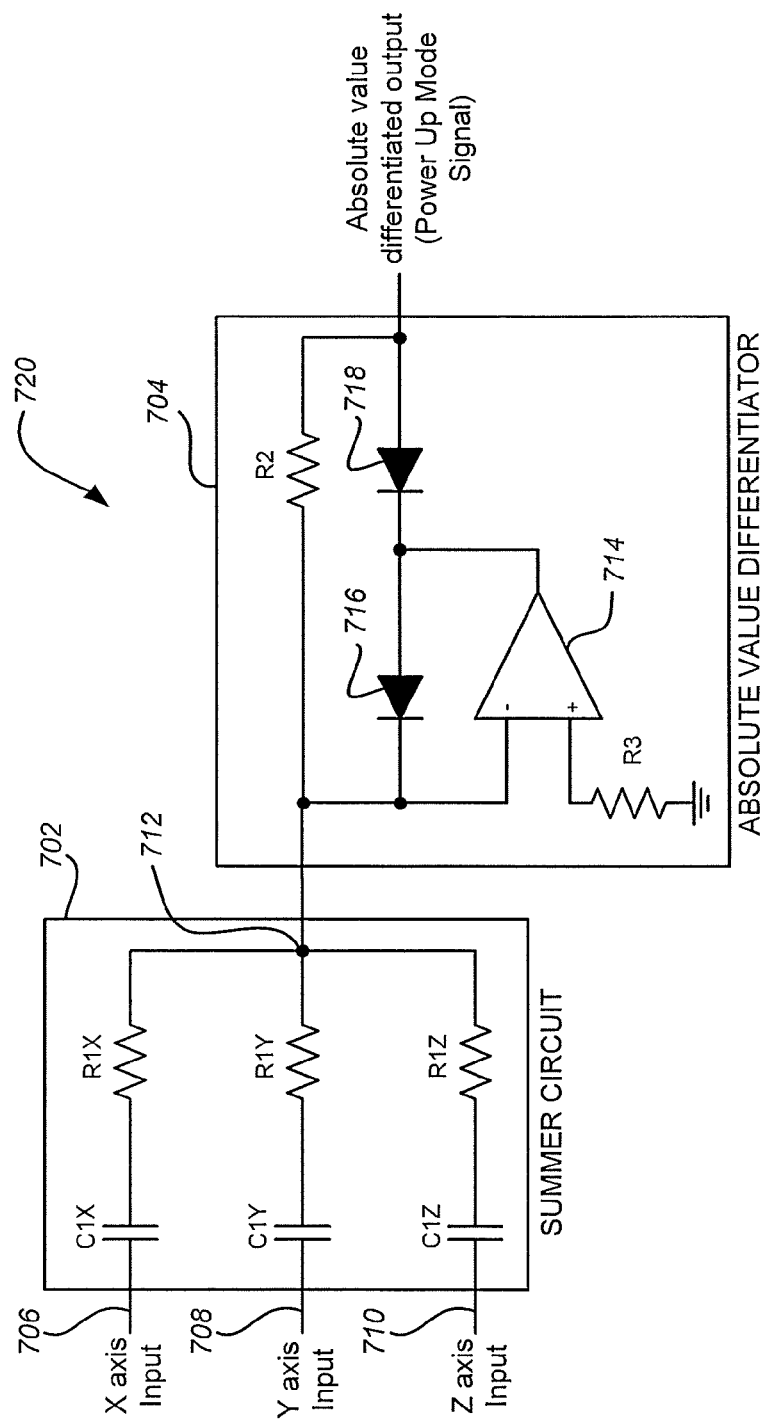
FIG. 7 is a schematic diagram of a motion detect circuit in accordance with an embodiment of the present disclosure.

Referring to FIG. 7, a schematic diagram of an exemplary motion detect circuit 720 in accordance with an embodiment of the present disclosure is illustrated. The motion detect circuit 720 includes summer circuit 702 and an absolute value differentiator 704. The summer circuit 702 has an input for each of the 3 axis outputs received from the sensor 402, i.e., input 706 for X axis input, input 708 for Y axis input, and input 710 for Z axis input. Each input 706, 708, 710 includes a capacitor in series with a resistor, e.g., C1X and R1X, C1Y and R1Y, C1Z and R1Z, and are summed at common node 712. The value summed at node 712 is then passed to the differentiator 704. The differentiator 704 includes an operational amplifier 714, first diode 716, a second diode 718, second resistor R2 and third resistor R3. If the component selection is restricted such that 2*R1=2*R3=R2. Then the output for unity gain is absolute value out=R2×C1 dA/dt, where dA/dt is the change in acceleration with respect to time.

Changing the gain of the amplifier 714 sets the change in acceleration that is needed to initiate the power up mode of the controller 400. In other words, the gain of amplifier 714 can be adjusted to create a threshold that the change in acceleration must exceed before the power up mode signal (power enable signal) is generated. Resistor R2 can be adjusted to increase the gain. By setting the gain of the differentiator 704, an input threshold for initiating the power up mode signal (power enable signal) can be set.

Having the motion detect circuit 704 in place allows the controller 400 to enter a power down mode indefinitely and only be powered up when the accelerometer is moved a predetermined amount, e.g., when the controller 400 is picked up. By including the threshold, the controller 400 will not enter the power up mode on unintentional movement, e.g., when a table the controller is resting on is bumped by a user. In the power down mode, power conservation or savings are achieved since no current is being drawn from the sensor 402 or accelerator when the device is at rest and no current is being drawn into the power source 416. Furthermore, the capacitors, i.e., C1X, C1Y, C1Z, direct current (DC) isolate the outputs from the accelerometer. Holding a steady voltage with no DC paths to ground brings the power usage as low as possible.

Figure 8:
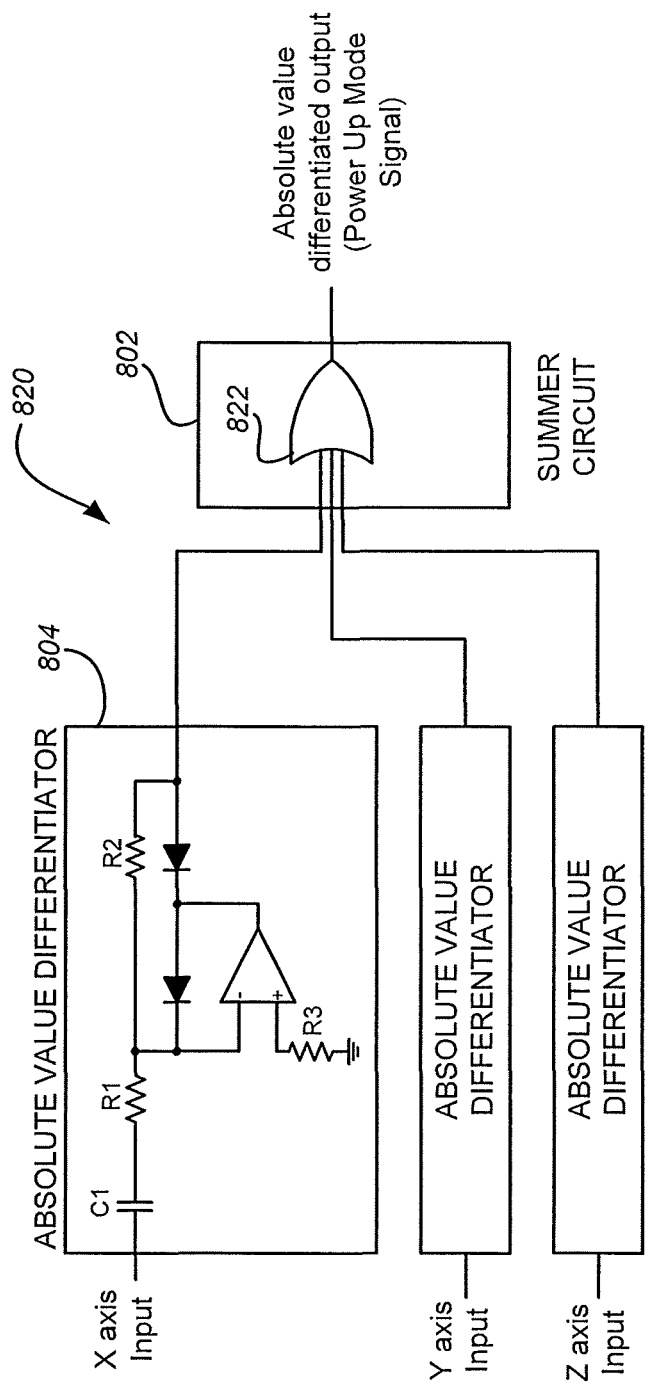
FIG. 8 is a schematic diagram of a motion detect circuit in accordance with another embodiment of the present disclosure.

Referring to FIG. 8, a schematic diagram of an exemplary motion detect circuit 820 in accordance with another embodiment of the present disclosure is illustrated. Functionally, the motion detect circuit 820 of FIG. 8 operates in a similar manner to the motion detection circuit 720 of FIG. 7. In this embodiment, an absolute value differentiator 804 is provided for each axis input. Although the schematic is only shown for the differentiator 804 of the X input axis, it is to be appreciated the differentiators for the Y and Z axis input are the same. The output of each differentiator 804 is then passed to a summer circuit 802 which is this embodiment may be an OR gate 822.

It is to be appreciated that the sensor 402 in FIG. 4 may be other known 3-axis motion sensing devices such as a gyroscopic based sensor. Although the embodiments above describe the absolute value differentiated output as being based on acceleration, other output parameters of motion sensing devices may be employed such as velocity, position, angular rate, etc. Further, the controller device described in FIG. 2 and FIG. 4 may be used in conjunction with media devices other than televisions and settop boxes, such as gaming consoles, computers, or presentation consoles.

Figure 9:
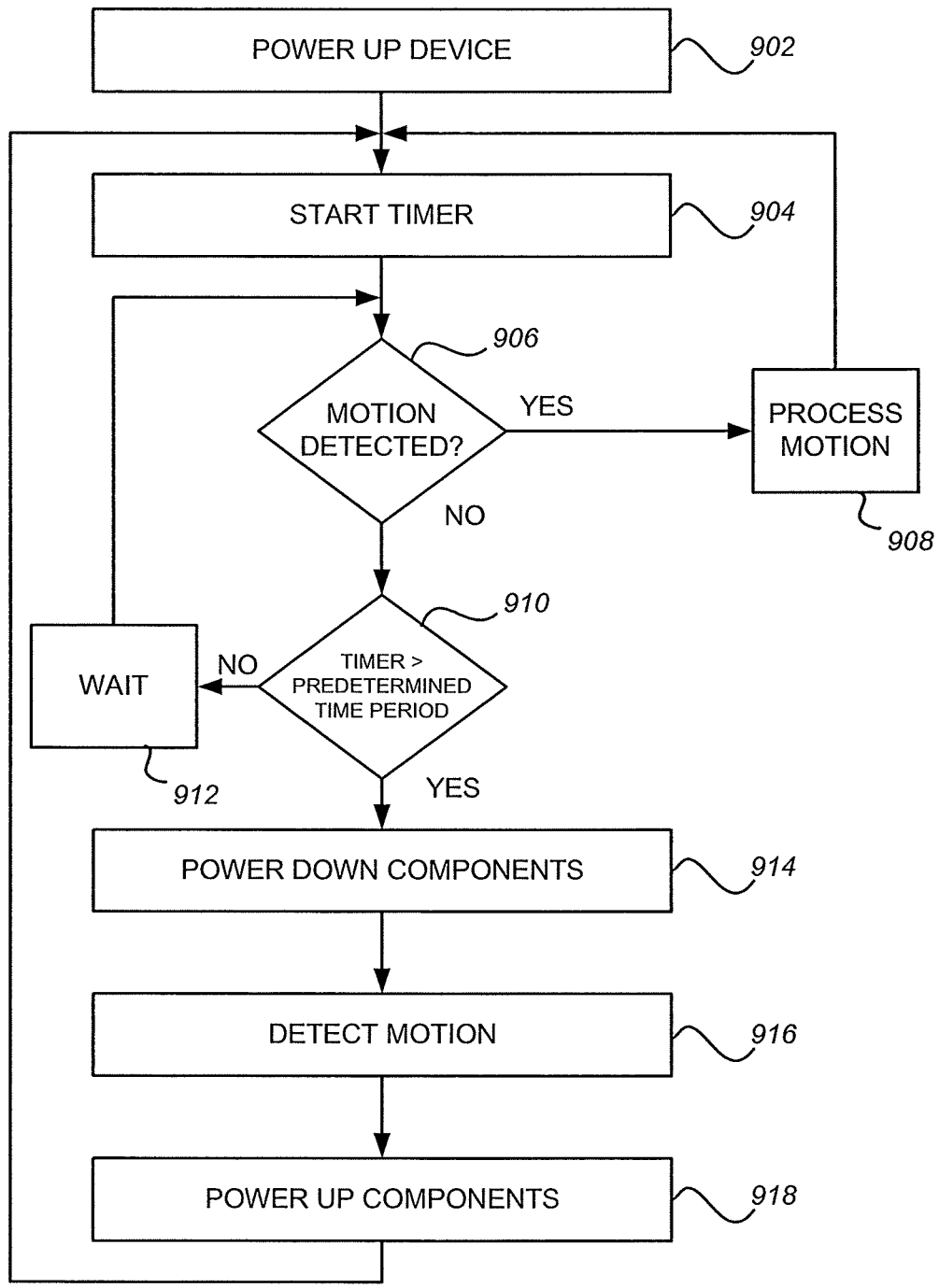
FIG. 9 is a flow diagram of an exemplary method for conserving power on a wireless hand-held motion-sensing controller according to an aspect of the present disclosure.

Referring to FIG. 9, a flow diagram of an exemplary method for conserving power on a wireless hand-less motion-sensing controller according to one embodiment of the present disclosure is provided. The steps of the flow diagram will primarily be described with respect to controller 400, but may equally applicable to other embodiments, including the embodiments shown in FIGS. 6-8. Initially, in step 902, the controller 400 is powered up via operating an on/off switch or disposing a power source, e.g., a battery, in the controller 400. As the controller 400 is powered up, the controller 400 will enter the power up mode and power will be provided via the power management circuit 418. In step 418, a timer will start to measure the period of time between at least two user inputs to the controller 400 or between at least two detected motions by the motion detect circuit 420. As described above, the timer may be part of the processing circuit 404 or the power management circuit 418.

Next, in step 906, the processing circuit 404 will determine if any motion is detected, i.e., if it has received any sense signals from the sensor 402. If the processing circuit 404 has received a sense signal, the processing circuit 404 will process the motion and/or transmit a signal to the transceiver 406, in step 908. The method will then cycle back to step 904 to restart the timer. In this manner, the timer is reset every time motion is processed. If no motion is detected in step 906, the method will proceed, in step 910, to determine if the timer has exceeded the predetermined time period. The time period vary depending on the application or user control, but may typically range from 10 seconds to 10 minutes. If the timer has not exceeded the predetermined time period, the method will wait, at step 912, and cycle back to step 906.

If the timer has exceeded the predetermined time period in step 910 after no motion has been detected, the controller 400 will enter the power down mode, in step 914. In power down mode, unnecessary components (e.g., processing circuit 404) will be powered down or shut off to conserve the power source 416. In one embodiment, the processing circuit 404 will perform the timing function and signal the power management circuit 418 to enter the power down mode, where the power management circuit 418 will selectively power down or shut off components. In another embodiment, the power management circuit 418 includes a timer or timing circuit to determine when to enter the power down mode and selectively power down or shut off components.

While the controller is at rest, only certain components will have power, e.g., at least the sensor 402 and motion detect circuit 420. By turning off the other components such as the processing circuit, power will be conserved. With power only supplied to select components, the motion detect circuit 420 will monitor each output of the sensor, e.g., the 3-axis output of the accelerometer, to determine if motion above a predetermined threshold has occurred, in step 916. As described above, the motion detect circuit 420 will generate a power up mode signal upon a differential motion in any one axis exceeding a predetermined threshold. Once motion has been detected in step 916, the controller 400 will go into power up mode, in step 918. Here, the motion detect circuit 420 will transmit the power up mode signal to power management circuit 418 which will subsequently supply power to the necessary components of the controller 400 for full functionality. Furthermore, once motion has been detected, the method will cycle back to step 904.

In another embodiment of the present disclosure, a controller, such as controller 400, may include all the components shown in FIG. 4 except the power management circuit. In this embodiment, the processing circuit 404 will perform the timing function and power down itself or place itself in a minimum power consumption state upon entering the power down mode. The motion detect circuit 420 will be coupled to the processing circuit 404 via connection 428 and will transmit a power up mode signal, e.g., an interrupt, to the processing circuit 404 upon detecting motion. All other components and functionality will be similar to that described above and therefore the details of which will not be repeated.

Although embodiments which incorporate the teachings of the present disclosure have been shown and described in detail herein, those skilled in the art can readily devise many other varied embodiments that still incorporate these teachings. Having described preferred embodiments of a power conservation circuit for a hand-held motion-sensing "in-air" pointing device and a method for conserving power on such devices including accelerometers (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure as outlined by the appended claims.

The invention claimed is:

1. A device comprising:
    a sensor that senses movement of the device and outputting a sense signal in response to the movement;
    a motion detect circuit coupled to the output of the sensor, the motion detect circuit receiving the sense signal from the sensor and outputting a power enable signal if the sense signal exceeds a threshold value;
    a power management circuit coupled to the motion detect circuit, the power management circuit receiving the power enable signal from the motion detect circuit (420) and outputting a power signal to initiate a power up mode as a result of receiving the power enable signal; and
    a processing circuit, coupled to the power management circuit and the sensor, the processing circuit, the processing circuit receiving the power signal along with receiving and processing the sense signal,
    wherein the sense signal, in response to movement, first, initiates the power up mode and, second, provides an input that defines a specific command for a graphic user interface.

2. The device as in claim 1, wherein the motion detect circuit differentiates the sense signal from the sensor.

3. The device as in claim 2, wherein the power management circuit disables power to the processing circuit if motion is not detected for a predetermined period of time.

4. The device as in claim 2, wherein the processing circuit provides a power disable signal to the power management circuit if motion is not detected for a predetermined period of time.

5. The device as in claim 1, wherein the sensor is a 3-axis motion sensing device.

6. The device as in claim 5, wherein the motion detect circuit is configured to detect an absolute value of the change in acceleration of at least one of the 3 axes.

7. The device as in claim 5, wherein the motion detect circuit includes an operational amplifier differentiator to detect an absolute value of the change in acceleration of at least one of the 3 axes.

8. The device as in claim 7, wherein a gain of the differentiator is adjustable to set a signal threshold and wherein the motion detect circuit provides a power enable signal to the power management circuit if the absolute value signal exceeds the signal threshold.

9. A method for conserving power in a wireless hand-held motion-sensing controller, the method comprising:
   sensing motion of the controller by a sensor and outputting a sense signal in response to the motion;
   outputting a power enable signal if the sense signal exceeds a threshold value; and
   providing a power signal to a processing circuit as part of initiating a start up mode based on the power enable signal,
   wherein the sense signal, in response to movement of the wireless handheld motion sensing controller, first, initiates the start up mode, and second, provides an input to the processing circuit that defines a specific command for a graphic user interface.

10. The method as in claim 9, further comprising differentiating the sense signal from the sensor to determine if the sense signal exceeds the threshold value.

11. The method as in claim 9, further comprising disabling power to the processing circuit if motion is not detected for a predetermined period of time.

12. The method as in claim 9, further comprising providing a power disable signal to the processing circuit if motion is not detected for a predetermined period of time.

13. The method as in claim 9, wherein the sensor is a 3-axis motion sensing device.

14. The method as in claim 13, further comprising determining an absolute value of the change in acceleration of at least one of the 3 axes in order to determine if the sense signal exceeds the threshold value.

15. The method as in claim 9, wherein the threshold value is adjustable.

16. A device comprising:
   a means for sensing motion of the device and outputting a sense signal in response to the motion;
   a means for outputting a power enable signal if the sense signal exceeds a threshold value; and
   a means for providing a power signal to a processing circuit as part of initiating a start up mode based on the power enable signal,
   wherein the sense signal, in response to movement of the wireless handheld motion sensing controller, first, initiates the start up mode, and second, provides an input to the processing circuit that defines a specific command for a graphic user interface.

17. The device as in claim 16, further comprising means for differentiating the sense signal from the sensor to determine if the sense signal exceeds the threshold value.

18. The device as in claim 16, further comprising means for disabling power to the processing circuit if motion is not detected for a predetermined period of time.

19. The method as in claim 16, further comprising means for providing a power disable signal to the processing circuit if motion is not detected for a predetermined period of time.

20. The device as in claim 16, wherein the sensor is a 3-axis motion sensing device.

21. The device as in claim 20, further comprising determining an absolute value of the change in acceleration of at least one of the 3 axes in order to determine if the sense signal exceeds the threshold value.

22. The device as in claim 21, wherein the absolute value is determined using an operational amplifier differentiator.

23. The device as in claim 16, wherein the threshold value is adjustable.

24. The method as in claim 14, wherein the absolute value is determined using an operational amplifier differentiator.

\* \* \* \* \*